(12) United States Patent
Legner

(10) Patent No.: US 7,739,020 B2
(45) Date of Patent: Jun. 15, 2010

(54) DEVICE FOR CONTROLLING FUNCTIONS OF A MOBILE VEHICLE, AND METHOD FOR CONTROLLING SAID FUNCTIONS

(75) Inventor: Jürgen Legner, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 786 days.

(21) Appl. No.: 10/588,745

(22) PCT Filed: Feb. 4, 2005

(86) PCT No.: PCT/EP2005/001142

§ 371 (c)(1),
(2), (4) Date: Aug. 9, 2006

(87) PCT Pub. No.: WO2005/078304

PCT Pub. Date: Aug. 25, 2005

(65) Prior Publication Data

US 2009/0005944 A1    Jan. 1, 2009

(30) Foreign Application Priority Data

Feb. 12, 2004    (DE) .................. 10 2004 006 790

(51) Int. Cl.
*F16D 48/00*    (2006.01)
*F16D 48/06*    (2006.01)

(52) U.S. Cl. ............... 701/67; 701/50; 701/51; 477/71; 477/93; 477/94; 477/166; 477/170

(58) Field of Classification Search .......... 701/50, 701/51, 53, 67; 477/71, 93, 94, 96, 166, 477/170, 171, 172
See application file for complete search history.

(56) References Cited

U.S. PATENT DOCUMENTS

| | | | |
|---|---|---|---|
| 4,979,599 A | | 12/1990 | Nishida |
| 6,039,673 A | * | 3/2000 | Mikami et al. ............... 477/93 |
| 6,113,515 A | | 9/2000 | Salecker et al. |
| 6,560,549 B2 | * | 5/2003 | Fonkalsrud et al. ........... 702/41 |
| 7,022,043 B2 | | 4/2006 | Luh |
| 7,025,708 B2 | * | 4/2006 | Rieger et al. ................. 477/171 |
| 2003/0205930 A1 | * | 11/2003 | Smart ........................... 303/20 |
| 2004/0210374 A1 | | 10/2004 | Werner et al. |
| 2005/0241873 A1 | | 11/2005 | Hofler |

FOREIGN PATENT DOCUMENTS

| | | |
|---|---|---|
| DE | 102 37 793 A1 | 3/2003 |
| DE | 102 22 664 A1 | 12/2003 |
| DE | 102 30 993 A1 | 1/2004 |

\* cited by examiner

*Primary Examiner*—Thomas G Black
*Assistant Examiner*—Peter D Nolan
(74) *Attorney, Agent, or Firm*—Davis & Bujold, P.L.L.C.

(57) ABSTRACT

A driving motor drives power-consuming devices and, via a clutch device, driving wheels as well. Upon actuation of a brake pedal, an electronic controller determines an input torque of the clutch device and disengages the clutch device when the brake pedal has reached a defined value that is dependent upon the input torque.

8 Claims, 2 Drawing Sheets

DEVICE FOR CONTROLLING FUNCTIONS OF A MOBILE VEHICLE, AND METHOD FOR CONTROLLING SAID FUNCTIONS

This application is a national stage completion of PCT/EP2005/001142 filed Feb. 4, 2005 which claims priority from German Application Serial No. 10 2004 006 790.2 filed Feb. 12, 2004.

FIELD OF THE INVENTION

The invention relates to a device for controlling the functions of a mobile vehicle and a method for controlling these functions.

BACKGROUND OF THE INVENTION

In mobile vehicles, particularly in work machines such as wheel loaders, there is a need to obtain sufficient power for the hydraulic system even when the service brake is actuated and thus the driving speed is low.

In work machines such as wheel loaders, on one hand, a driving motor drives the driving wheels via a hydrodynamic torque converter and a clutch device and, on the other hand, drives the power-consuming devices, such as hydraulic pumps which, for example, the loading shovel of the wheel loader is operated. Wheel loaders comprise a control function, as a result of which, at the beginning of the loading operation, the driving clutch is opened upon actuation of the service brake, this acts upon the vehicle wheels by disconnecting the hydraulic actuating pressure in a hydraulic, actuated clutch element. As a result of the opening of the driving clutch, the engine power is available almost exclusively to the vehicle hydraulic system for actuating the piston/cylinder arrangement of the loading shovel. Above all, this is associated with the fact that without this control function a very high power loss develops in the torque converter when the drive is connected and the vehicle service brake is actuated, since the turbine wheel in the converter has come to a complete or nearly complete halt, while the pump wheel, driven by the driving motor, rotates at the stall speed.

DE 102 30 993 A1 describes a method for controlling functions of an occupational vehicle, where a driving motor drives vehicle wheels via a driving clutch, and a service brake acts upon the vehicle wheels, and the driving motor drives a hydraulic pump, with the driving clutch between the driving motor and the driving wheels being automatically opened and the service brake being automatically closed when the load acting upon the driving device of the vehicle, for example the weight of the loader shovel, exceeds a predefined load threshold or is actuated such that DE 102 30 993 A1 describes a method for controlling functions of an occupational vehicle, where a driving motor drives vehicle wheels, via a driving clutch; a service brake acts upon the vehicle wheels, and the driving motor drives a hydraulic pump with the driving clutch between the driving motor and the driving wheels is automatically opened. The service brake is automatically closed when the load acting upon the driving device of the vehicle, for example, the weight of the loader shovel, exceeds a predefined load threshold or is actuated such that it exceeds this threshold. A wheel loader, however, may encounter a plurality of driving situations in which it is not always desirable to automatically open the service brake and the clutch device with an exceeding load on the working device. For example, if the wheel loader travels up a ramp to the unloading site when feeding a crushing or sorting system, there is a possibility that the wheel loader is slowed down upon actuating the working device, although it has not yet assumed the final position. In the same way, based on the level of dexterity, there is also the possibility that the clutch device is opened when the automatic system is not used, while the service brake has not yet been sufficiently closed resulting in the vehicle rolling down the ramp.

It is the object of the present invention to create a device for controlling the functions of a mobile vehicle and a method for controlling these functions in which a clutch device, which is set between the driving motor and the vehicle wheels, can be opened in order to supply the power-consuming devices with sufficient power and thereby to take the different driving situations of the vehicle into consideration.

SUMMARY OF THE INVENTION

The driving motor 12 drives a power-consuming device 14, according to the invention, and, via a clutch device 16, also the driving wheels 18. It comprises a means for determining the input torque of the clutch device 16. The means is configured, for example, as electronic controllers 20, which with the presence of a hydrodynamic torque converter 22 between the driving motor 12 and the clutch device 16, use the determined rotational speed information, particularly the pump rotational speed as well as the turbine rotational speed of the hydrodynamic torque converter 22 and the characteristic rotational speed line of the converter to determine the input torque of the clutch device 16. Additionally, a means is provided for determining the deceleration request, which can be configured, for example, as rotation angle sensors on the brake pedal 24 or as pressure sensors in the brake lines. The clutch device is then opened when a previously defined deceleration request and a previously defined torque have been reached.

In another embodiment, a signal that is proportional to the brake pedal 24 is fed to an electronic controller 20, which determines the input torque upon recognizing a brake signal: then determines a deceleration request that was previously defined for this input torque, which may correspond, for example, to a defined pedal position and, upon achieving this deceleration request, actuates the clutch device 16 so as to open it. A change of the input torque between the initial actuation of the brake pedal 24 and the time the deceleration request required for opening the clutch device 16 is reached, for example, a sufficient pedal signal, is not taken into consideration.

In another embodiment, the amount of the input torque influences the required deceleration request in order to open the clutch device 16, for example, upon actuation of the brake pedal 24, if a high input torque is determined because a wheel loader is driving up a ramp, the clutch device 16 is only opened when a high deceleration request has been reached, which corresponds to an almost completely engaged brake pedal 24. This ensures that the clutch device 16 does not open too early, i.e., that the service brake is not yet sufficiently closed, since this type of opening would cause the vehicle to roll back if it were located on a ramp. If a low input torque is determined upon actuation of the service brake, the clutch device 16 opens at a lower deceleration request and thus with a short pedal path of the brake pedal 24. It is preferable to determine the input torque when the brake pedal 24 has been actuated, however, the service brake has as yet caused no deceleration. By storing the correlation with the required deceleration request in an electronic controller 20, the clutch device 16 is suitably opened at precisely the correct time for every driving situation.

BRIEF DESCRIPTION OF THE DRAWING

The invention will now be described, by way of example, with reference to the accompanying drawing in which.

DETAILED DESCRIPTION OF THE INVENTION

Figure 1:
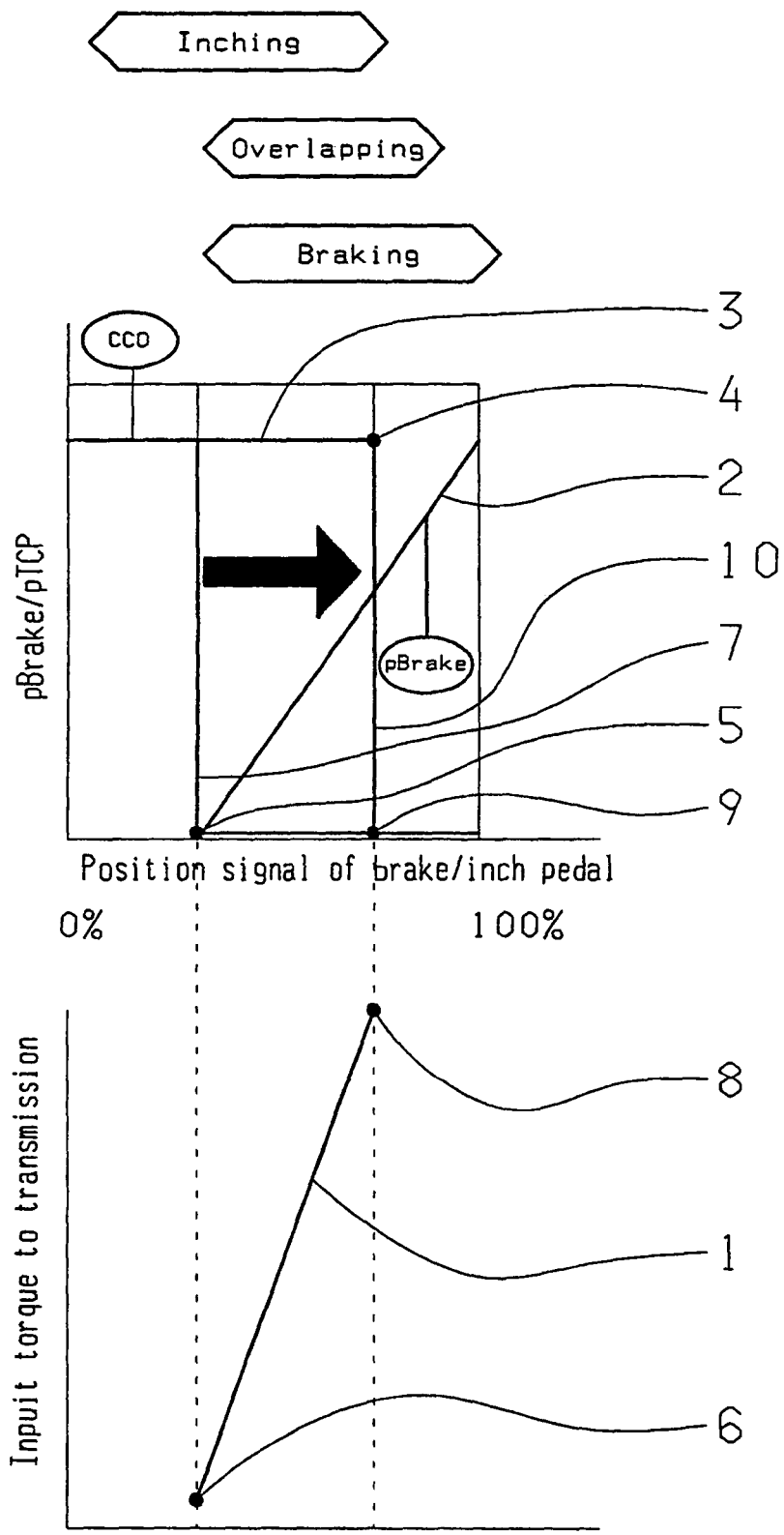
FIG. 1 shows a schematic illustration of the method for controlling the function of the mobile vehicle and FIG. 2 shows schematic illustration of a vehicle with a device for controlling functions of the vehicle.
Figure 2:
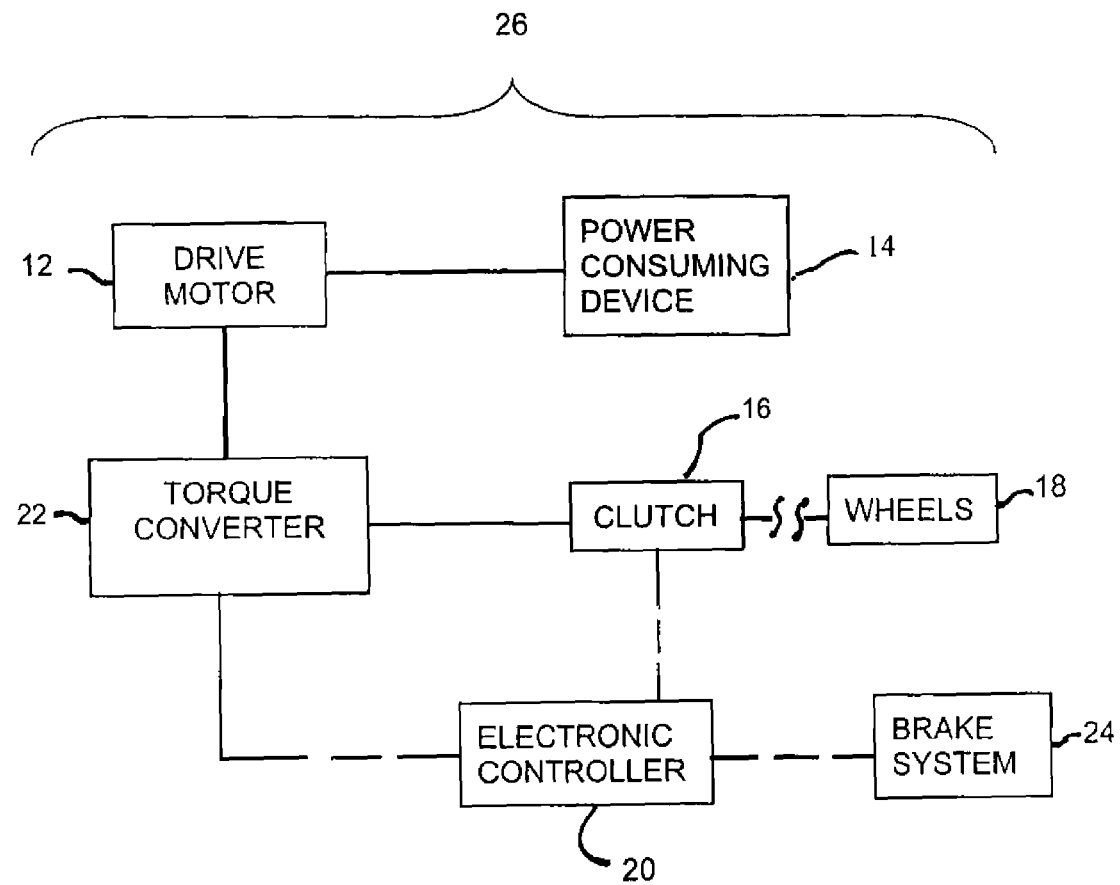

Line 1 of FIG. 1 shows a determined input torque on a clutch device 16 of the vehicle 26 shown in FIG. 2. Line 2 is a braking pressure acting upon a service brake and thus represents a measure of the vehicle deceleration. Line 3 represents an engaging pressure for the clutch device 16, wherein at point 4, a clutch device 16 is disengaged, which is evident from a reduced actuating pressure applied on the clutch 16. For example, if a mobile vehicle 26 is traveling and the brake pedal 24 is actuated, as is shown at point 5, an electronic controller 20 determines the input torque of the clutch unit 16. If a low torque is determined, as is shown at point 6, the clutch device 16 disengages with a short pedal path, which is evident from line 7. If a high torque is determined, which is evident at point 8, then a distinctly larger pedal path is required in order to disengage the clutch device 16, which is illustrated with point 9 and line 10. This ensures that with a distinctly higher input torque, the service brake assumes a greater engaging state in order to prevent the vehicle 26 from rolling back as a result of the disengaging of the clutch device 16.

REFERENCE NUMERALS 1 line
2 line
3 line
4 point
5 point
6 point
7 line
8 point
9 point
10 line

The invention claimed is:

1. A control device for controlling functions of a vehicle which has a drive motor connected to a hydraulic pump and to a hydrodynamic torque converter, which is connected to a clutch, and the clutch is connected to the drive wheels of the vehicle, the control device comprising:
   a brake system and a brake system sensor which detects actuation of the brake system and issues a braking signal having a value that correlates to a strength of the braking actuation;
   an electronic controller which determines an input torque of the clutch and disengages the clutch depending on the determined input torque of the clutch and the braking signal; and
      the hydrodynamic torque converter is located between the clutch and the driving motor and comprises a pump wheel and a turbine wheel, the input torque is determined from a rotational speed of the pump wheel, the rotational speed of the turbine wheel and a characteristic rotational speed line of the hydrodynamic torque converter.

2. The device for controlling functions of the vehicle according to claim 1, wherein the strength of the braking actuation is determined from one of a braking pressure and a position of a brake pedal.

3. A method of controlling functions of a vehicle which has a drive motor connected to a hydraulic pump and to a hydrodynamic torque converter which is connected to a clutch, and the clutch is connected to the drive wheels of the vehicle, the method comprising the steps of:
   detecting actuation of a brake system with a brake system sensor which issues a braking signal having a value that correlates to a strength of the braking actuation;
   determining an input torque of the clutch with an electronic controller upon reception of the braking signal by the electronic controller;
   basing the determination of the input torque of the clutch on a rotational speed of a pump of the hydrodynamic torque converter, a rotational speed of a turbine of the hydrodynamic torque converter and a characteristic rotational speed line of the hydrodynamic torque converter;
   braking the vehicle upon recognition of the braking signal; and
   disengaging the clutch as a function of the determined input torque of the clutch and the value of the braking signal.

4. The method for controlling functions of the vehicle according to claim 3, further comprising the step of associating a predefined braking signal with the determined input torque of the clutch and only disengaging the clutch when the value of the braking signal correlates to a value of the predefined braking signal.

5. The method for controlling functions of the vehicle according to claim 4, further comprising the step defining the value of the braking signal as a measure of a brake pedal path and a braking pressure.

6. The method for controlling functions of a vehicle according to claim 3, further comprising the step of detecting actuation of the brake system with the brake system sensor prior to braking the vehicle with a service brake.

7. The method for controlling functions of the vehicle according to claim 6, further comprising the step of actuating the service brake when the value of the braking signal corresponds to a defined braking signal.

8. A method of controlling functions of a vehicle which has a drive motor connected to a hydraulic pump and to a hydrodynamic torque converter which is connected to a clutch, and the clutch is connected to the drive wheels of the vehicle, the method comprising the steps of:
   detecting actuation of a vehicle brake system with a brake system sensor and issuing a braking signal with the brake system sensor which has a value correlating to a strength of the actuation of the brake system;
   determining an input torque of the clutch with an electronic controller upon reception of the braking signal by the electronic controller, the input torque of the clutch being dependant upon a rotational speed of a pump of the hydrodynamic torque converter, a rotational speed of a turbine of the hydrodynamic torque converter and a characteristic rotational speed line of the hydrodynamic torque converter;
   braking the vehicle with the brake system upon reception of the braking signal in the electronic controller;
   associating a predetermined braking signal with the determined input torque of the clutch;
   comparing the value of the braking signal with a value of the predetermined braking signal; and
   only disengaging the clutch when the value of the braking signal matches the value of the predetermined braking signal.

* * * * *